US011487254B2

(12) United States Patent
Johannesson et al.

(10) Patent No.: US 11,487,254 B2
(45) Date of Patent: Nov. 1, 2022

(54) UTILIZING SPATIAL STATISTICAL MODELS FOR IMPLEMENTING AGRONOMIC TRIALS

(71) Applicant: Climate LLC, San Francisco, CA (US)

(72) Inventors: Gardar Johannesson, Oakland, CA (US); Maria Terres, San Francisco, CA (US); Moslem Ladoni, Dublin, CA (US); Carlos Carrion, Sunnyvale, CA (US); Nicholas Cizek, Stanford, CA (US); Brian Lutz, St. Charles, MO (US); Ricardo Lemos, San Francisco, CA (US); James Delaney, Tiburon, CA (US)

(73) Assignee: Climate LLC, San Francisco, CA (US)

(*) Notice: Subject to any disclaimer, the term of this patent is extended or adjusted under 35 U.S.C. 154(b) by 376 days.

(21) Appl. No.: 16/723,892

(22) Filed: Dec. 20, 2019

(65) Prior Publication Data

US 2020/0201269 A1    Jun. 25, 2020

Related U.S. Application Data

(60) Provisional application No. 62/782,587, filed on Dec. 20, 2018.

(51) Int. Cl.
*G05B 13/04*  (2006.01)
*G06F 17/18*  (2006.01)
(Continued)

(52) U.S. Cl.
CPC .......... *G05B 13/048* (2013.01); *A01B 79/005* (2013.01); *A01B 79/02* (2013.01); *G06F 17/18* (2013.01)

(58) Field of Classification Search
CPC ..... G05B 13/048; A01B 79/005; A01B 79/02; G06F 17/18
See application file for complete search history.

(56) References Cited

U.S. PATENT DOCUMENTS

| | | | |
|---|---|---|---|
| 2003/0019408 A1* | 1/2003 | Fraisse | A01B 49/06 111/100 |
| 2004/0237394 A1* | 12/2004 | Mayfield | A01C 21/007 47/58.1 FV |

(Continued)

FOREIGN PATENT DOCUMENTS

WO    WO 0195219 A1    12/2001

OTHER PUBLICATIONS

The International Searching Authority, "Search Report" in application No. PCT/US19/67870, dated Apr. 16, 2020, 23 pages.

(Continued)

*Primary Examiner* — Gary Collins
(74) *Attorney, Agent, or Firm* — Morrison & Foerster LLP

(57) ABSTRACT

Systems and methods for utilizing a spatial statistical model to maximize efficacy in performing trials on agronomic fields are disclosed herein. In an embodiment, a system receives first yield data for a first portion of an agronomic field, the first portion of the agronomic field having received a first treatment, and second yield data, for a second portion of the agronomic field, the second portion of the agronomic field having received a second treatment that is different than the first treatment. The system uses a spatial statistical model and the first yield data to compute a yield value for the second portion of the agronomic field, the yield value indicating an agronomic yield for the second portion of the agronomic field if the second portion of the agronomic field had received the first treatment instead of the second treatment. Based on the computed yield value and the second (Continued)

yield data, the system selects the second treatment. In an embodiment, in response to selecting the second treatment, the system generates a prescription map, the prescription map including the second treatment. The system may also generate one or more scripts which, when executed by an application controller, cause the application controller to control an operating parameter of an agricultural implement to apply the second treatment.

20 Claims, 8 Drawing Sheets

(51) Int. Cl.
*A01B 79/00* (2006.01)
*A01B 79/02* (2006.01)

(56) References Cited

U.S. PATENT DOCUMENTS

| | | | |
|---|---|---|---|
| 2011/0166788 A1* | 7/2011 | Griffin | G06Q 50/02 702/5 |
| 2014/0012732 A1* | 1/2014 | Lindores | A01B 79/005 705/37 |
| 2016/0057922 A1 | 3/2016 | Freiberg et al. | |
| 2016/0247082 A1* | 8/2016 | Stehling | G06Q 50/02 |
| 2017/0196171 A1* | 7/2017 | Xu | G06Q 10/04 |
| 2018/0322344 A1 | 11/2018 | Shriver et al. | |
| 2019/0107521 A1* | 4/2019 | Riley | G01K 3/14 |
| 2020/0150631 A1* | 5/2020 | Frieberg | G06F 16/2465 |

OTHER PUBLICATIONS

Current Claims in application No. PCT/US19/67870, dated Apr. 2020, 5 pages.

* cited by examiner

Fig. 2
(a)
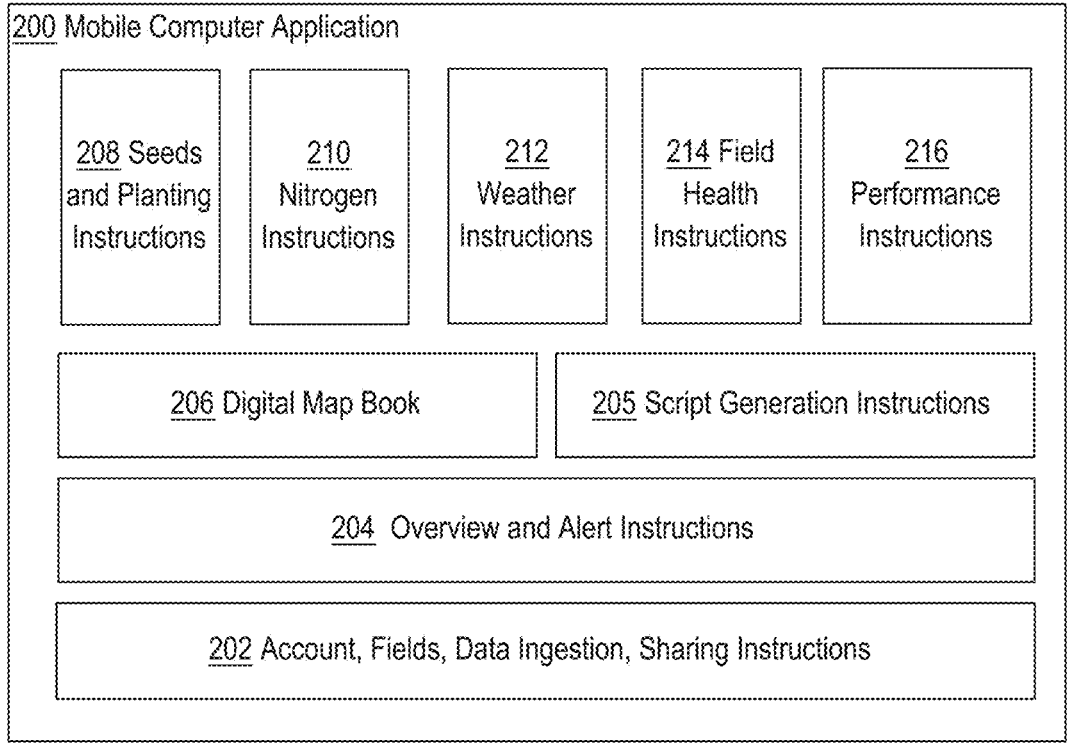
(b)
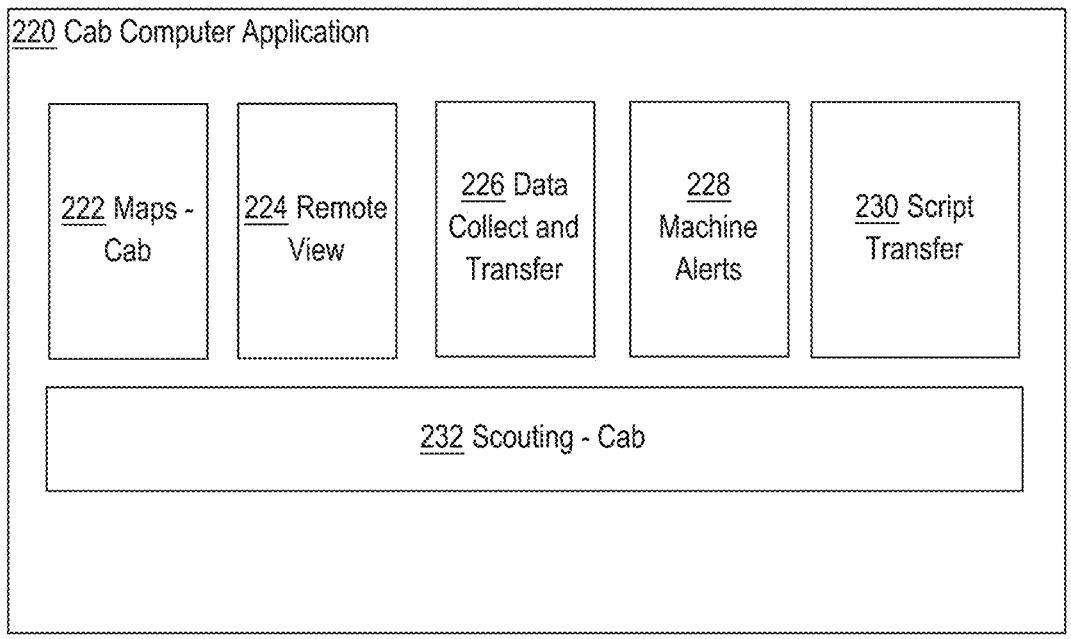

FIG. 6

Data Manager

Nitrogen | Planting | Practices | Soil

Planting 1(4 Fields)
Crop Corn Product
Plant Date: 2016-04-12
ILU 112 | Pop: 34000
Edit   Apply Planting 2(0 Fields)
Crop Corn Product
Plant Date: 2016-04-15
ILU 83 | Pop: 34000
Edit   Apply Planting 3(0 Fields)
Crop Corn Product
Plant Date: 2016-04-13
ILU 83 | Pop: 34000
Edit   Apply Planting 4(1 Fields)
Crop Corn Product
Plant Date: 2016-04-13
ILU 112 | Pop: 34000
Edit   Apply Add New Planting Plan

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | — | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

# UTILIZING SPATIAL STATISTICAL MODELS FOR IMPLEMENTING AGRONOMIC TRIALS

BENEFIT CLAIM

The present disclosure claims the benefit under 35 U.S.C. § 119 as a Non-Provisional Application of Provisional Application No. 62/782,587, filed Dec. 20, 2018, the entire contents of which is incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2015-2019 The Climate Corporation.

FIELD OF THE DISCLOSURE

One technical field of the present disclosure is digital computer modeling of agricultural fields. Specifically, the present disclosure relates to identifying locations for implementing particular practices in an agricultural field and causing agricultural implements to execute the particular practices in the agricultural field.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Farmers are faced with a wide variety of decisions to make with respect to the management of agricultural fields. These decisions range from determining what crop to plant, which type of seed to plant for the crop, when to harvest a crop, whether to perform tillage, irrigation, application of pesticides, including fungicides and herbicides, and application of fertilizer, and what types of pesticides or fertilizers to apply.

Often, improvements may be made to the management practices of a field by using different hybrid seeds or different seed varieties, applying different products to the field, or performing different management activities on the field. These improvements may not be readily identifiable to a farmer working with only information about their own field. Additionally, even when made aware of better practices, a farmer may not be able to determine whether a new practice is beneficial over a prior practice.

In order to determine if a new practice produces better results than a prior practice, a farmer may devote a portion of an agricultural field to trials where one or more parts of the agricultural field receives different management practices than other parts of the agricultural field. By implementing trials on a part of the agricultural field, a farmer is able to continue utilizing the agricultural field in a prior effective manner while testing different practices to determine if they would have improved results.

One issue with implementing a trial on an agronomic field is that it is not always clear if a perceived benefit or detriment of a trial is an actual benefit or detriment, field level aberration, or statistical anomaly. This issue is compounded when the different treatments are only expected to have a small effect on the yield in an agronomic field. One reason for this issue is that the results of an agronomic trial are often compared to neighboring regions' or prior years' yield, both of which may vary from the yield in the trial locations for reasons other than the variance in treatment.

Another issue with implementing these trials is that it is not always clear to a farmer where to best place trial locations for the highest efficiency use of the agricultural field. Some regions may have a larger innate variance, such that changes in yield are less statistically significant than in other locations. Thus, a farmer's trial practices may tie up a large portion of the field in strip trials to produce a set of results that could have been produced with the same level of statistical significance while utilizing a smaller portion of the agricultural field.

Thus, there is a need for a system which utilizes field data to identify testing locations for implementing a trial. Additionally, there is a need for a system which utilizes field data to determine whether the effects of a trial are significant enough to justify changing management procedures on other portions of the field.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Figure 1:
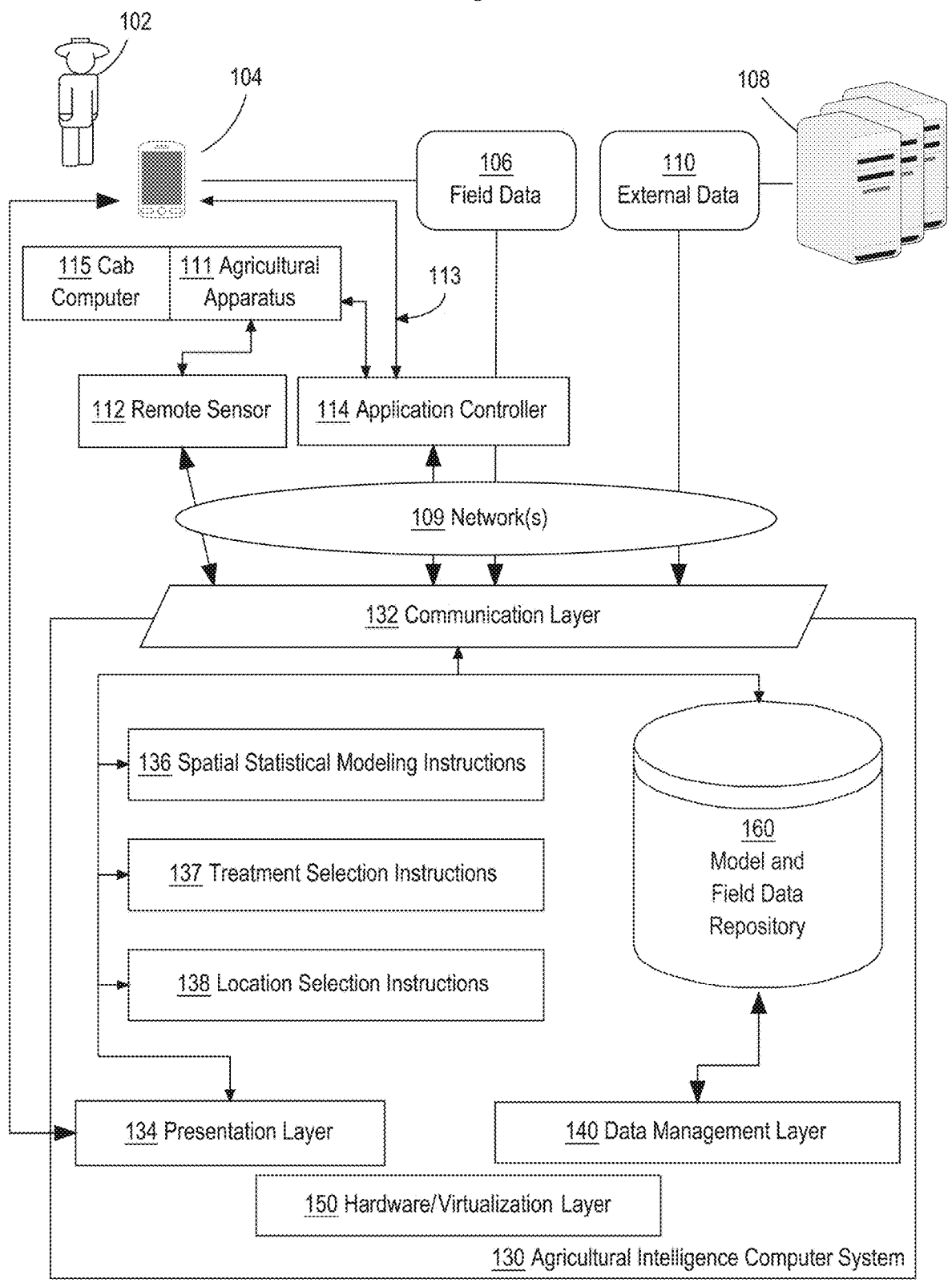
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. GENERATING AN INFERRED CONTROL USING SPATIAL MODELING
   3.1. RECEIVED DATA
   3.2. STATISTICAL MODEL
   3.3. DETERMINING A TRIAL EFFECT
   3.4. PRACTICAL APPLICATIONS OF THE STATISTICAL MODEL
4. IDENTIFYING TRIAL LOCATIONS USING SPATIAL MODELING
   4.1. STATISTICAL MODEL
   4.2. SELECTING PORTIONS OF THE AGRONOMIC FIELD
   4.3. PRACTICAL APPLICATIONS OF THE LOCATION IDENTIFICATION
5. BENEFITS OF CERTAIN EMBODIMENTS
6. EXTENSIONS AND ALTERNATIVES

1. GENERAL OVERVIEW

Systems and methods for utilizing spatial statistical models as part of a practical implementation of an agronomic trial on an agronomic field are described herein. According to an embodiment, an agricultural intelligence computer system generates a spatial statistical model based on yield data for a portion of an agronomic field that received a first treatment and uses the spatial statistical model to compute yield values for a location that received a second treatment. The computed yield values can then be compared to yield data for the location that received the second treatment to determine if the second treatment had a beneficial or detrimental effect over the first treatment. The system may then generate prescription maps that implement the second treatment if the second treatment is deemed to be more beneficial than the first treatment. The spatial statistical model could additionally be used to identify locations on the agronomic field where the spatial statistical model is most effective and generate prescription maps which include trials in the identified locations.

In an embodiment, a method comprises receiving first yield data for a first portion of an agronomic field, the first portion of the agronomic field having received a first treatment; receiving second yield data for a second portion of the agronomic field, the second portion of the agronomic field having received a second treatment that is different than the first treatment; using a spatial statistical model and the first yield data, computing a yield value for the second portion of the agronomic field, the yield value indicating an agronomic yield for the second portion of the agronomic field if the second portion of the agronomic field had received the first treatment instead of the second treatment; based on the computed yield value and the second yield data, selecting the second treatment; in response to selecting the second treatment, generating a prescription map, the prescription map including the second treatment; generating one or more scripts which, when executed by an application controller, cause the application controller to control an operating parameter of an agricultural implement to apply the second treatment.

In an embodiment, a method comprises receiving yield data for an agronomic field, the agronomic field having received a first treatment; for each of a plurality of particular portions of the agronomic field, performing: using a spatial statistical model and yield data for a separate portion of the agronomic field, computing a yield value for the particular portion of the agronomic field; and using the yield value and a portion of the yield data corresponding to the particular portion of the agronomic field, computing an average statistical deviation value for the particular portion of the agronomic field; based on the average statistical deviation values for each of the plurality of particular portions of the agronomic field, selecting one or more of the plurality of particular portions of the agronomic field as trial portions of the agronomic field; in response to selecting the trial portions of the agronomic field, generating a prescription map comprising a second treatment that is different from the first treatment in the trial portions; generating one or more scripts which, when executed by an application controller, cause the application controller to control an operating parameter of an agricultural implement to apply the second treatment to the trial portions of the agronomic field.

2. EXAMPLE AGRICULTURAL INTELLIGENCE COMPUTER SYSTEM

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h)

weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, prescription maps, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
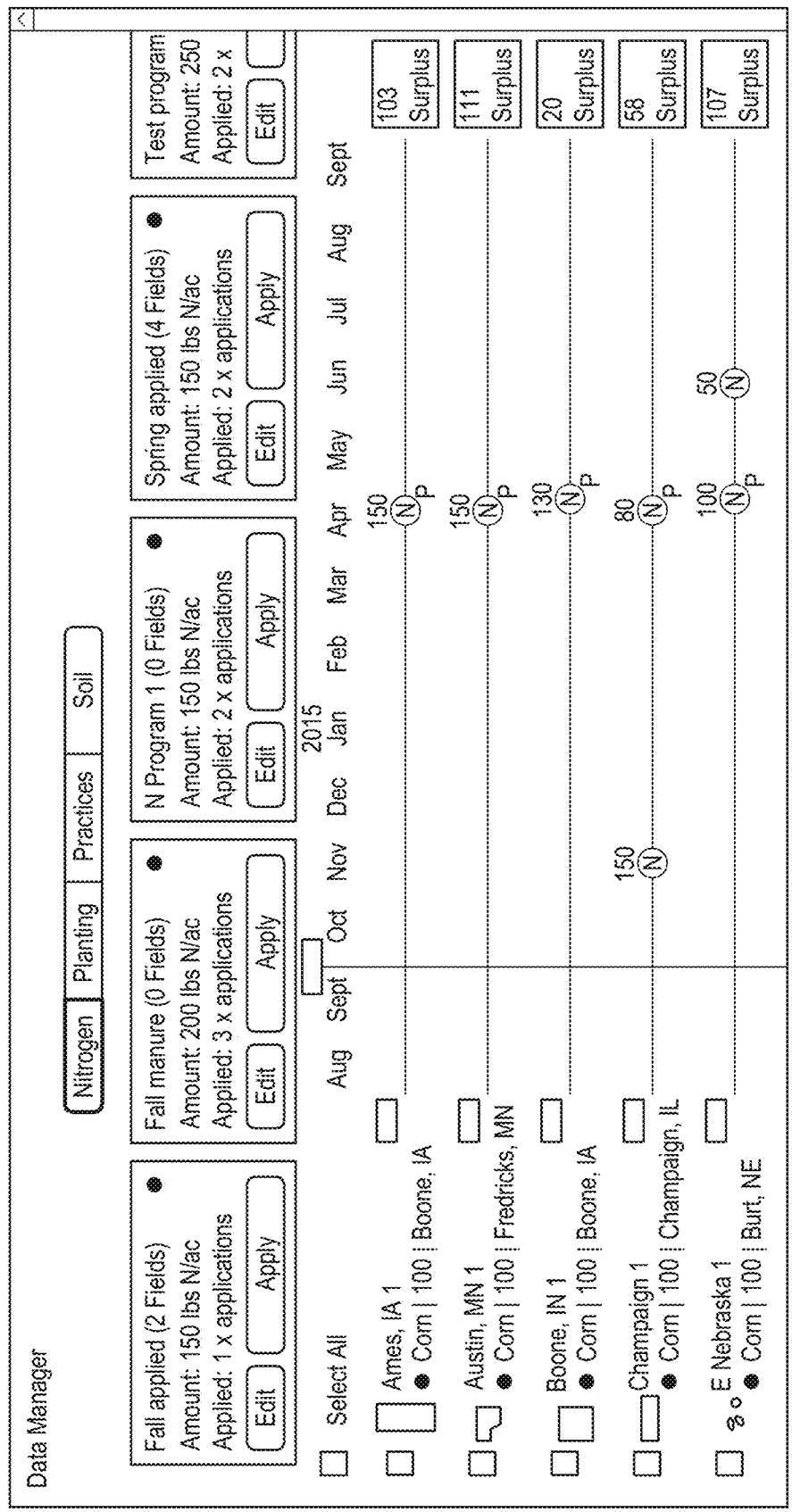
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of spatial statistical modeling instruction 136, treatment selection instructions 137, and location selection instructions 138 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, spatial statistical modeling instruction 136 may comprise a set of pages in RAM that contain instructions which when executed cause spatial statistical modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of spatial statistical modeling instruction 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Spatial statistical modeling instruction 136 comprise a set of computer readable instructions which, when executed by one or more processors, cause the agricultural intelligence computer system to generate a spatial statistical model of yield for use in generating control data for an agronomic trial and/or for use in identifying locations for implementing a trial. Treatment selection instructions 137 comprise a set of computer readable instructions which, when executed by one or more processors, cause the agricultural intelligence computer system to select a particular treatment based on a spatial statistical model of yield and yield data for one or more testing locations on a field which received a different treatment as the rest of the agronomic field. Location selection instructions 138 comprise a set of computer readable instructions which, when executed by one or more processors, cause the agricultural intelligence computer system to select locations for implementing a trial based on a spatial statistical model of yield and yield data for the agronomic field.

Figure 4:
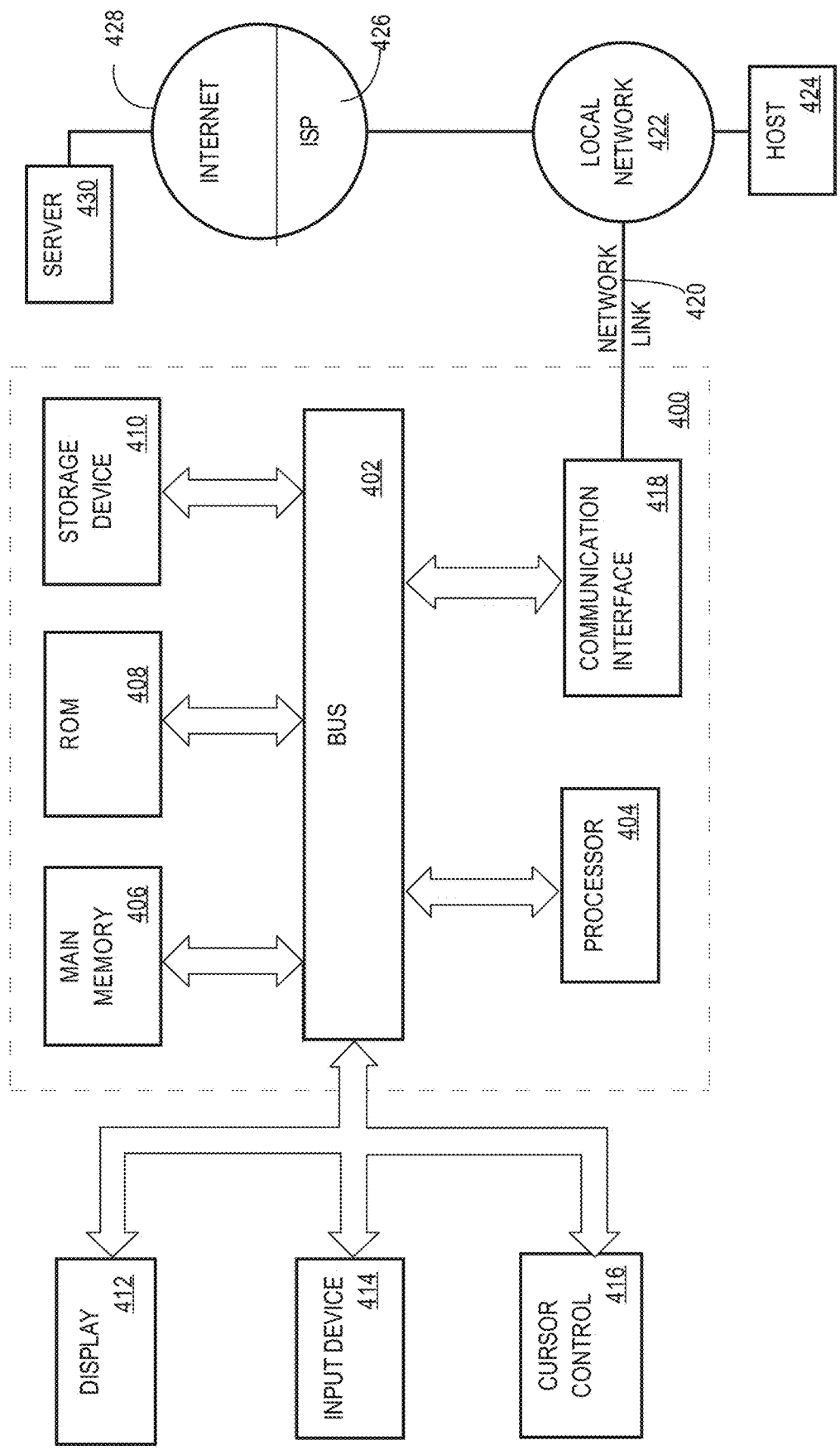
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields.

The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
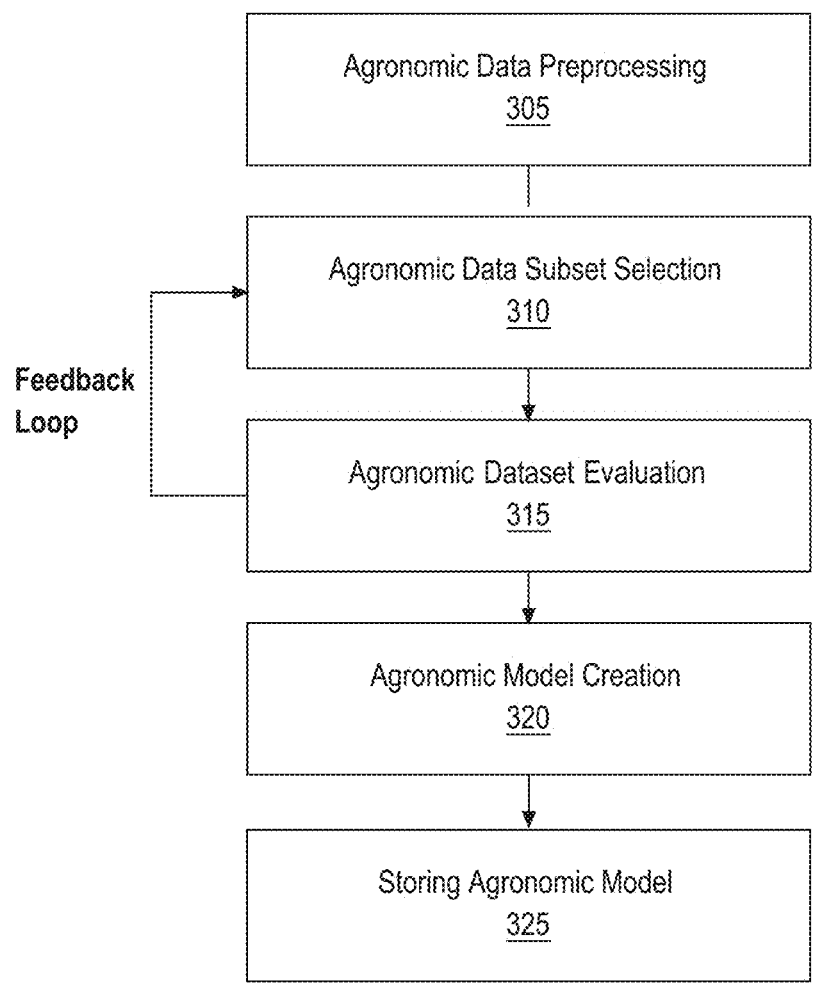
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. GENERATING AN INFERRED CONTROL USING SPATIAL MODELING

Figure 7:
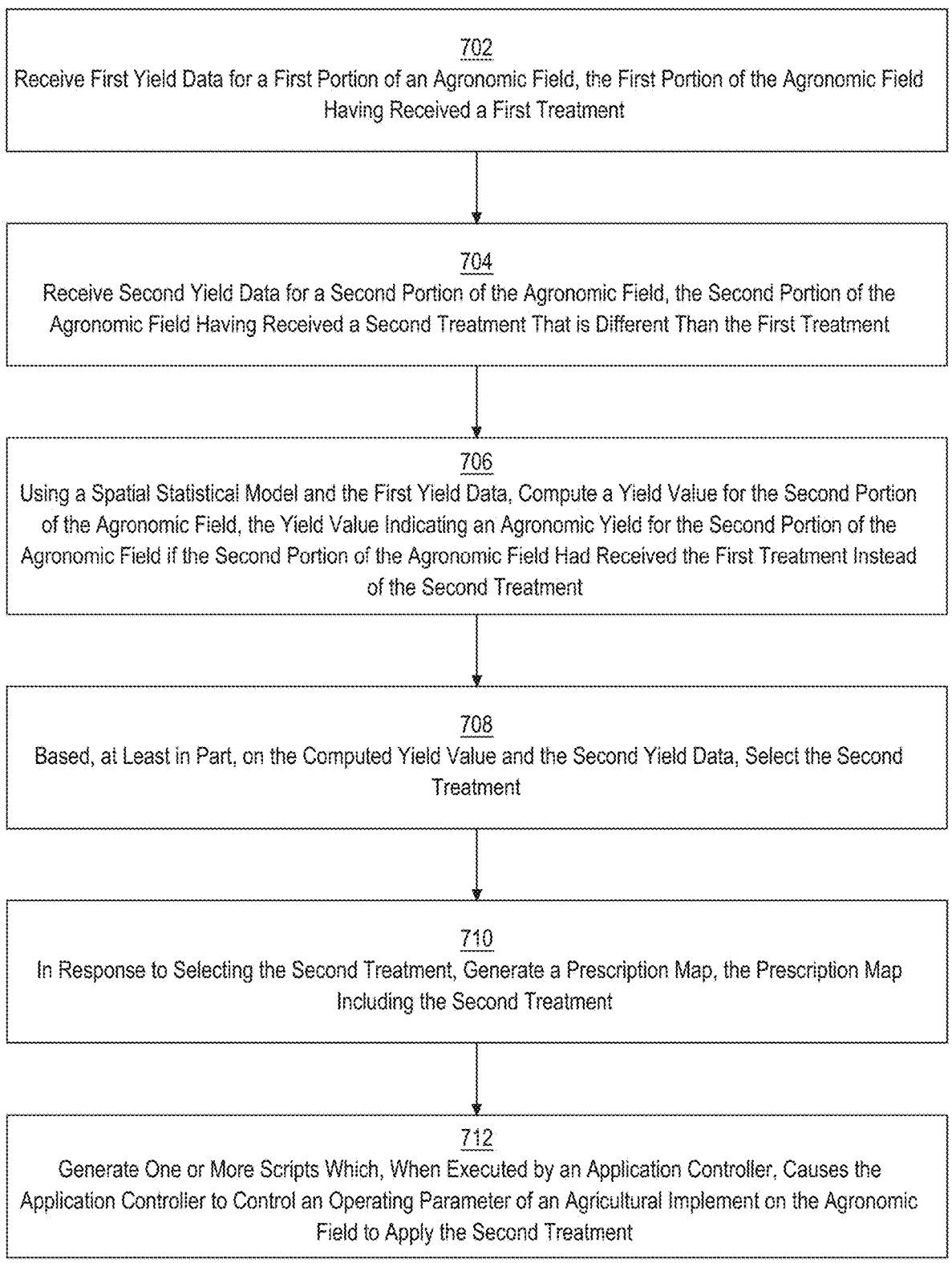
FIG. 7 depicts a method for using a spatial statistical model to infer control data for an agronomic trial.

FIG. 7 depicts a method for using a spatial statistical model to infer control data for an agronomic trial. While FIG. 7 uses yield data as an example, the methods described herein may be utilized to infer control data for other attributes of interest, such as grain quality, protein content, and other factors to be assessed and/or measured by the experiment. As used herein, a trial refers to performing one or more different agricultural activities in a portion of an agricultural field in order to identify a benefit or detriment of performing the one or more different agricultural activities. As an example, a subfield area may be selected in an agricultural field to implement a fungicide trial. Within the subfield area, the crops may receive an application of fungicide while the rest of the field and/or a different subfield area on the field does not receive an application of fungicide. Alternatively, the rest of the field may receive the application of fungicide while the crops within the subfield area do not. The subfield areas of the field where the one or more different agricultural activities are performed are referred to herein as test locations. In some embodiments, subfield areas that do not include the different agricultural activities can also be assigned and referred to as test locations.

Trials may be performed for testing the efficacy of new products, different management practices, different crops, or any combination thereof. For example, if a field usually does not receive fungicide, a trial may be designed wherein crops within a selected portion of the field receive fungicide at one or more times during the development of the crop. As another example, if a field usually is conventionally tilled, a trial may be designed wherein a selected portion of the field is not tilled. Thus, trials may be implemented for determining whether to follow management practice recommendations instead of being constrained to testing the efficacy of a particular product. Additionally or alternatively, trials may be designed to compare two different types of products, planting rates, equipment, and/or other management practices.

Trials may be constrained by one or more rules. A trial may require one or more testing locations to be of a particular size and/or placed in a particular location. For example, the trial may require one or more testing locations to be placed in an area of the field with comparable conditions to the rest of the field. A testing location, as used herein, refers to an area of an agricultural field that receives one or more different treatments from surrounding areas. Thus, a testing location may refer to any shape of land on an agricultural field. Additionally or alternatively, the trial may require one or more testing locations to be placed in an area of the field with conditions differing from the rest of the field and/or areas of the field spanning different types of conditions. The trial may require one or more different management practices to be undertaken in one or more testing locations. For example, a trial may require a particular seeding rate as part of a test for planting a different type of hybrid seed.

In an embodiment, the methods described herein are used to cause implementation of the trial. For example, the methods described herein may be used to identify locations in an agricultural field for implementing the trial. The methods described herein may further be used to generate agricultural scripts which comprise computer readable instructions which, when executed, cause an agricultural implement to perform an action on the field according to the trial. In an embodiment, the methods described herein are used to determine an efficacy of a trial and cause performance of a responsive action. For example, if the method determines that the trial treatment was more effective than the non-trial treatment, the method may include generating a prescription map which includes the trial treatment on a larger portion of the agronomic field. The methods may further include generating agricultural scripts which comprise computer readable instructions which, when executed, cause an agricultural implement to perform an action on the field according to the results of the trial.

3.1. Received Data

At step 702, first yield data is received for a first portion of an agronomic field, the first portion of the agronomic field having received a first treatment. For example, the agricultural intelligence computer system may receive yield data from a field manager computing device, an agricultural implement, an external computing device, and/or an imaging device. The first yield data may include average agronomic yield values for a plurality of locations on an agricultural field. For example, a harvester may measure agronomic yield while harvesting a crop for $10 \times 10$ meter$^2$ locations, thereby generating a pixel map of agronomic yield values. Additionally or alternatively, the yield data may comprise index values, such as the normalized difference vegetative index value (NDVI), generated from imagery of an agronomic field, such as imagery captured using drones and/or satellites.

The first treatment, as used herein, refers to one or more management practices that are being performed in the non-trial location. For example, the first treatment may comprise any of a particular seeding population, hybrid type, seed type, pesticide application, nutrient application, or other management practices. The server computer may receive data indicating locations on the agronomic field that have received the first treatment.

At step 704, second yield data is received for a second portion of the agronomic field, the second portion of the agronomic field having received a second treatment that is different than the first treatment. For example, the agricultural intelligence computer system may receive yield data from a field manager computing device, an agricultural implement, an external computing device, and/or an imaging device.

The second treatment may be a trial treatment that differs from the first treatment. For example, if the first treatment is application of a fungicide, the second treatment may be an application of a different fungicide. In an embodiment, the second portion of the agronomic field is treated the same as the first portion of the agronomic field except for the difference in the first and second treatments. For example, a same seed hybrid may be planted with a same population in both locations, but the second portion of the agronomic field may receive a different fertilizer application than the first portion of the agronomic field.

In an embodiment, the second portion of the agronomic field comprises one or more trial strips. As used herein, a trial refers to performing one or more different agricultural activities in a portion of an agricultural field in order to identify a benefit or detriment of performing the one or more different agricultural activities. A trial strip, as used herein, refers to a location on the agronomic field that can be treated in one or more full passes of an agronomic vehicle. In an embodiment, the first portion of the agronomic field at least partially surrounds the second portion of the agronomic field. For example, the first portion of the agronomic field may be a strip on one side of the second portion, a strip on both sides of the second portion, a remainder of the field aside from the trial location, and/or any portion of the agronomic field that is at least partially abutting the second portion.

3.2. Statistical Model

At step 706, a yield value for the second portion of the agronomic field is computed using a spatial statistical model and the first yield data. The yield value indicates an agronomic yield for the second portion of the agronomic field if the second portion of the agronomic field had received the first treatment instead of the second treatment. For example, the yield value may include yield values for each of a plurality of locations in the second portion of the agronomic field and/or an average yield for the second portion of the agronomic field.

In an example embodiment, the agronomic field is divided into a plurality of grid points of equal size, such as 10×10 meter$^2$ locations. Yield values for the first portion of the agronomic field are used to compute values for the second portion the agronomic field using a spatial statistical model:

$$y(s_i) = \mu + w(s_i) + \epsilon_i$$

where $y(s_i)$ is the yield for the i-th grid point at location $s_i$, $\mu$ is the overall mean yield for the agronomic field aside from the second portion of the agronomic field, $w(s_i)$ is a spatially correlated process, and $\epsilon_i$ is a small-scale error process which can be fit based on variances in the field between computations using the spatial statistical model and the actual yield at those locations.

In an embodiment, the spatially correlated process $w(s_i)$ is a zero-mean spatially correlated Gaussian process, such as the Gaussian Random Fields equation with a variance of $\tau^2$ and a spatial correlation function $k_p$. Thus, the distribution of for the vector of grid points in the second portion of the agronomic field may be computed as:

$$y_0 \sim N(1_{n_0}\mu, \tau^2 K_p + \sigma^2 I_{n_0})$$

which can be computed as a Gaussian process model with a constant mean function. The matrix $K_p$ comprises a variance-covariance matrix with the ij-th element given by $k_p(s_i, s_j)$. The system may parameterize the Gaussian process using the yield values at the locations in the first portion of the agronomic field. The variance and standard deviation parameters, $\tau$ and $\sigma$, may be parameterized using any parameterization method, such as the maximum likelihood estimates method, based on the yield values in the locations in the first portion of the agronomic field.

By using a statistical spatial process, the methods described herein are capable of inferring yield values for each of a plurality of trial locations, such as a testing strip, based on different application types. Thus, the spatial process is used to infer what the yield values would be for the location if the trial location received a different treatment. An example implementation of the fitting of the above described model comprises using the GSTAT package available on GITHUB.

While the methods described herein are capable of producing yield values for the trial locations based on non-trial treatments using only yield data for a current year, the spatial model may be strengthened if yield data from prior years was available. By utilizing prior years of yield data in the Gaussian process model, the method is capable of capturing spatial variability within the trial locations. For example, a yield map from a first year may comprise yield data where the entire field received the same treatments. Thus, the spatial variability in the trial locations for a second year where the trial locations received a different treatment can be modeled based on the spatial variability of yield in the yield data from the first year where the trial locations received the same treatment as the rest of the field.

In an embodiment, the agricultural intelligence computer system models the inferred yield in the second portion of the agronomic field as a function of one or more covariates. The one or more covariates may include additional values relevant to agronomic yield for the different locations on the agronomic field. Examples of covariates may include percent of organic matter, pH, cation-exchange capacity, elevation, soil type, nutrient level, NDVI values when measured yield values are utilized, and/or any other measurable property that can vary across the agronomic field. Data for the covariate values may be received from an external server, such as the Soil Survey Geographic database (SSURGO), received through input from a field manager computing device, and/or received directly or indirectly from an agricultural implement operating on the agronomic field configured to measure one or more of the above described covariates.

As an example, the yield values for the second portion of the agronomic field may be computed using the following function:

$$y(s_i) = \mu + x_i\beta + w(s_i) + \epsilon_i$$

where $x_i$ is a vector of covariates for the i-th grid point and $\beta$ is an associated parameter vector that is either estimated or fit using current yield data and/or yield data for previous years.

In an embodiment, the agricultural intelligence computer system jointly models yield data in the second portion of the agronomic field and the first portion of the agronomic field, utilizing data from both the first portion of the agronomic field and the second portion of the agronomic field to fit the model. An example equation for modeling agronomic yield simultaneously in the first and second portion of the agronomic field is as follows:

$$y(s_i) = \mu + \delta\mu_i + x_i\beta + w(s_i) + \epsilon_i$$

where $\delta$ is an effect of applying the second treatment to the second portion of the agronomic field instead of the first treatment, $\mu_i$ is a treatment indicator which equals 0 for each location where the first treatment was applied and equals 1 for each location where the second treatment was applied. While in previous equations $y(s_i)$ was used to compute an inferred yield in the second portion of the agronomic field if the second portion received the first treatment, in the above equation, $y(s_i)$ comprises a measured yield in each location and is fit to the Gaussian process to estimate $\delta$, the average effect of applying the second treatment to the second portion of the agronomic field.

In an embodiment, separate spatial variability models are used to compute estimated effects of applying the second treatment to the second portion of the agronomic field instead of the first treatment. As an example, the agricultural intelligence computer system may fit a spatial model as:

$$y(s_i) = \mu + \delta\mu_i + x_i\beta + w_{\mu_i}(s_i) + \epsilon_i$$

where $w_{\mu_0}$ is a spatial model for the locations where the first treatment was applied and $w_{\mu_1}$ is a spatial model for the locations where the second treatment was applied. The two portions of the agronomic field do not share parameters that characterize the spatial variability, but the two spatial models are assumed to be correlated, such as through an intrinsic coregionalization model.

While methods are described above with respect to two treatments, the methods described herein may be utilized with a plurality of treatments in a plurality of locations. For example, if an agronomic field comprises two strip trials and one main treatment, the yields in the main treatment locations may be used to generate the spatial model for computing the inferred yields using the main treatment in the other locations. As another example, two the effects of applying either of the two treatments may be computed as:

$$y(s_i) = \mu + \delta_1\mu_{1,i} + \delta_2\mu_{2,i} + x_i\beta + w(s_i) + \epsilon_i$$

where $\delta_1$ is an effect of applying a second treatment to the agronomic field, $\delta_2$ is an effect of applying a third treatment to the agronomic field, $\mu_{1,i}$ is 1 when the second treatment is applied and 0 at all other times, and $\mu_{2,i}$ is 1 when the third treatment is applied and 0 at all other times.

While the example above describes equal sized grid locations of 10×10 meter², in some situations, data may be received at different resolutions based on the field. When data is received at a finer resolution, it can make the Gaussian model described above computationally prohibitive to compute, with complexity growing as a cube of a number of data points. Additionally, some spatial correlation structures for agronomic data may be more complex and less stationary. Thus, techniques may be used to better model complex spatial structures while decreasing the computation complexity.

In an embodiment, a fixed rank kriging model is used to decrease the computational scalability for datasets of larger sizes. In the fixed rank kriging technique, a vector S is defined as a sequence of basis functions. The correlation matrix, $K_p$, may thus be defined as:

$$K_p = SMS'$$

which may then be incorporated into the model above. The M matrix may be a smaller rank matrix than $K_p$. The unknown, symmetric, positive definite matrix M may be estimated from the agronomic data, using the binned method of moments estimation procedure.

In an embodiment, a discrete process convolution model is used to decrease the computational cost of using large datasets while also capturing more complex spatial correlation structures. A discrete process convolution model may comprise a multiresolution model whereby a plurality of sets of progressively coarsening grids are defined for a particular data set. For example, if yield data for a particular field is received at a high spatial resolution, such as 5×5 meter² locations, a first grid may be generated with 5×5 meter² locations, a second, coarser grid may be generated with 10×10 meter² locations, and so on. The model may be computed using each of r grid points, such as through the following equation:

$$y(s_i) = \mu + \sum_{j=1}^{r} k(s_i - s_j^*) \times \eta_j^* + \varepsilon_i, \; \eta_j^* \overset{iid}{\sim} \mathcal{N}(0, \tau^2), \; \varepsilon_i \overset{iid}{\sim} \mathcal{N}(0, \sigma^2).$$

where $s_j^*$ is a total for all locations in a grid containing location $s_j$. The parameters $\eta_j^*$ and $\varepsilon_i$ may be estimated using least-squares, maximum likelihood, or a Bayesian posterior calculation.

In an embodiment, the correlation function $k(s_i - s_j^*)$ may be selected to have compact support, for example the spherical correlation function. Then when the model is expressed in matrix form, the correlation matrix K will be sparse and have a structure that can be exploited for computation efficiency by specialized software, such as the PYTHON SCIPY package's sparse.linalg module.

3.3. Determining a Trial Effect

At step 708, the second treatment is selected based, at least in part, on the computed yield value and the second yield data. For example, the agricultural intelligence computer system may determine a standard deviation of any of the above yield models. The system may compute an average of the inferred yields for the second portion of the agronomic field. The system may use the average of the inferred yields and the standard deviation to compute one or more threshold values. For example, the system may compute an upper threshold value as the average inferred yield plus 1.6 times the standard deviation of the yield, thereby generating an upper 90% threshold value. The system may also compute a lower threshold value as the average inferred yield minus 1.6 times the standard deviation of the yield, thereby generating a lower 90% threshold value.

The agricultural intelligence computer system may use the computed threshold values to determine if the second treatment had a statistically significant effect on the agronomic field. For example, the agricultural intelligence computer system may compute an average yield for the second portion of the agronomic field based on the yield data received for the second portion of the agronomic field. If the computed average yield for the second portion of the agronomic field is greater than the upper threshold value, the system may determine that the second treatment had a beneficial effect and select the second treatment. If the computed average yield for the second portion of the agronomic field is lower than the lower threshold value, the system may determine that the second treatment had a detrimental effect and select the first treatment.

In an embodiment, the agricultural intelligence computer system utilizes yield data for a prior year to determine the standard deviation for the second portion of the agronomic field. For example, the agricultural intelligence computer system may receive yield data for a prior year where both the first portion of the agronomic field and the second portion of the agronomic field received the same treatments. The system may utilize the spatial model described herein to compute a yield values for the second portion of the agronomic field based on the first portion of the agronomic field. The system may then compute a difference value, for each location in the second portion of the agronomic field, the difference value comprising a difference between the computed yield using the spatial model and the actual yield. The system may then fit the difference values to a distribution, such as a normal distribution, and compute the standard deviation of the fit distribution. If multiple previous years of data are available, the system may perform this method for each previous year and use the average standard deviation across the plurality of years.

3.4. Practical Applications of the Statistical Model

The systems and methods described herein utilize a spatial statistical model to determine whether results of an agronomic trial are statistically significant, thereby allowing the system to generate prescription maps based on the results of the trial, generate scripts based on the results of the trial, display data indicating a benefit or detriment of the trial, and/or display maps identifying trial results in a plurality of locations along with data indicating a significance of the trial results.

As an example of a practical application, at step 710, a prescription map is generated in response to selecting the second treatment, the prescription map including the second treatment. For instance, if the agricultural intelligence computer system determines that the second treatment is beneficial using the methods described herein, the system may select the second treatment to be applied to a greater portion of the field. Thus, the system may generate a prescription map comprising a spatial map of the agronomic field with data indicating which treatments to apply to different locations of the field. The prescription map may include the second treatment being applied to a portion of the field that is larger than the second portion of the agronomic field. For example, if the treatment was originally applied to a single trial strip, the system may generate a prescription map which includes multiple trial strips, an entirety of a management zone, an entire segment of the agronomic field, an entirety of an agronomic field excluding strips used for different trials, and/or the whole of the agronomic field.

By automatically generating a prescription map in response to a selection of the second treatment, the system is able to utilize the spatial statistical model as part of the practical process of generating a prescription map. The system is also able to effectuate a change in management practices not only in response to increase in agronomic yield from one location to another, but in response to an increase in agronomic yield in a single location compared to an estimated yield for that location and/or a determination that the increase in agronomic yield is statistically significant.

In an embodiment, the agricultural intelligence computer system is programmed or configured to perform responsive actions if system determines that an increase or decrease in yield is not statistically significant and/or if the system determines that a decrease in yield is statistically significant. For example, if the agricultural intelligence computer system determines that the agronomic yield in the second portion of the agronomic field is at least 1.6 standard deviations less than the inferred agronomic yield for the second portion of the agronomic field, the system may generate future prescription maps that exclude the second treatment altogether. Additionally or alternatively, if the system determines that the results are not statistically significant, the system may generate a new prescription map which includes the second treatment being applied to the second portion of the agronomic field and/or one or more different portions of the agronomic field.

As an additional example of a practical embodiment, at step 712, one or more scripts are generated. The scripts comprise computer readable instructions which, when executed by an application controller, causes the application controller to control an operating parameter of an agricultural implement, such as agricultural apparatus 111, on the agronomic field to apply the second treatment. The scripts may be configured to match the generated prescription map such that the scripts, when executed, cause one or more agricultural implements to execute the prescriptions in the prescription map. The agricultural intelligence computer system may send the scripts to a field manager computing device and/or the application controller over a network.

As example, if the second treatment comprises a different seeding population than the first treatment, the system may generate instructions which, when executed, cause a planter to release seeds onto the field at the population rate of the second treatment in locations on the agronomic field that match the generated prescription map. Other examples of scripts include nutrient application scripts, pesticide scripts, and/or other planting scripts which vary seed type or seed hybrid. Thus, the methods described herein may be used to operate agriculture machinery based on a determination of trial performance generated from a spatial statistical model.

4. IDENTIFYING TRIAL LOCATIONS USING SPATIAL MODELING

Figure 8:
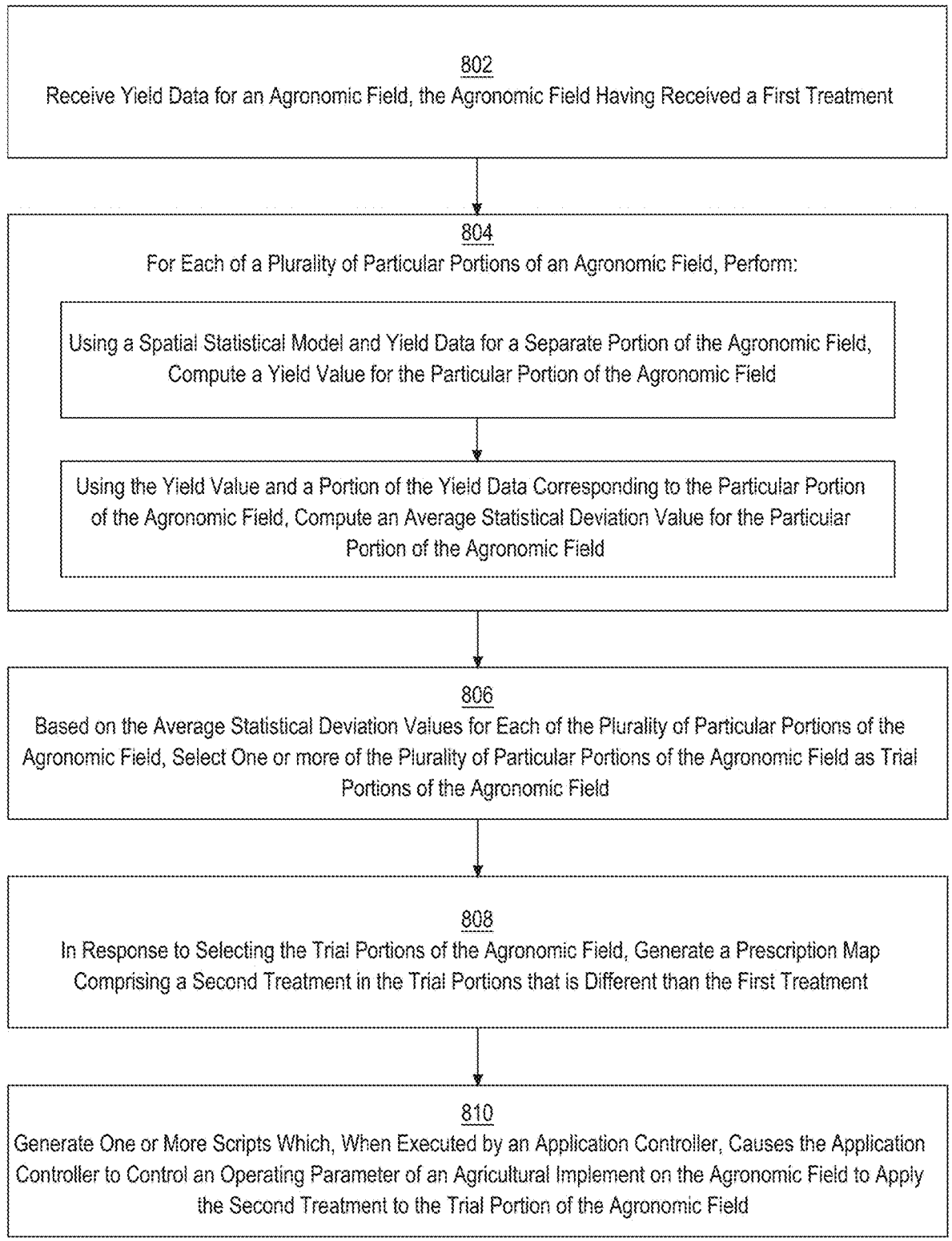
FIG. 8 depicts a method for using a spatial statistical model to select locations for performing a trial.

FIG. 8 depicts a method for using a spatial statistical model to select locations for performing a trial. At step 802, yield data is received for an agronomic field, the agronomic field having received a first treatment. For example, the agricultural intelligence computer system may receive yield data from a field manager computing device, an agricultural implement, an external computing device, and/or an imaging device. The yield data may include average agronomic yield values for a plurality of locations on an agricultural field. For example, a harvester may measure agronomic yield while harvesting a crop for 10×10 meter$^2$ locations, thereby generating a pixel map of agronomic yield values. Additionally or alternatively, the yield data may comprise index values, such as the normalized difference vegetative index value (NDVI), generated from imagery of an agronomic field, such as imagery captured using drones and/or satellites.

The first treatment, as used herein, refers to one or more management practices that are being performed on the agronomic field. For example, the first treatment may comprise any of a particular seeding population, hybrid type, seed type, pesticide application, nutrient application, or other management practices. The server computer may receive data indicating locations on the agronomic field that have received the first treatment.

4.1. Statistical Model

At step 804, a spatial statistical model is used to compute an average statistical deviation value for each of a plurality of particular portions of the agronomic field. For example, the system may identify a plurality of locations on the agronomic field where a trial is capable of being performed. Identifying the plurality of locations may comprise identifying locations within a portion of the agronomic field that received the same treatment that match one or more criteria. For example, the agricultural intelligence computer system may identify locations on the agronomic field that have at least a specific length and/or width, have a certain amount of space around them, and/or meet any other criteria.

For each of the identified locations, the system may compute an average deviation. First, for a particular portion of the agronomic field, a yield value is computed using a spatial statistical mode and yield data for a separate portion of the field. For example, the system may utilize the statistical model described in Section 3.2. to compute yield values in one location within the portion of the agronomic field that received the same treatment based on the remaining portions. Thus, if the particular portion is a strip in the middle of the agronomic field, the system may generate the statistical spatial model using the yield data in all of the agronomic field except for the strip and use the statistical spatial model to compute yield values in the strip.

Then, using the yield value and a portion of the yield data corresponding to the particular portion of the agronomic field, an average statistical deviation value for the particular portion of the agronomic field is computed. For example, for each location in the particular portion of the field, the system may compute a difference between the yield values from the yield data and the computed yield values from the statistical spatial model. The system may compute the average difference of values in the particular portion of the agronomic field. Additionally or alternatively, the system may compute an average of the absolute values of the differences, thereby indicating average overall variability from the statistical model. Additionally or alternatively, the system may use the difference values to compute a standard deviation for the particular portion of the agronomic field under the assumption that the statistical model follows a normal distribution. The system may then perform the same process with one or more other portions of the agronomic field.

4.2. Selecting Portions of the Agronomic Field

At step 806, one or more of the plurality of particular portions of the agronomic field are selected as trial portions of the agronomic field based on the average statistical deviation values for each of the plurality of particular portions of the agronomic field. For example, the agricultural intelligence computer system may select one or more locations with the lowest average statistical deviation. By selecting the locations with the lowest average statistical deviation, the system is able to increase the statistical significance of gains or losses in the trial locations on the agronomic field, thereby reducing the amount of the agronomic field that needs to be treated differently to produce statistically significant results and/or allowing for the production of statistically significant results at smaller levels of benefit or detriment.

In an embodiment, the agricultural intelligence computer system determines whether to select one location or a plurality of locations based on the computed deviation values. For example, the agricultural intelligence computer system may determine an expected benefit of a second treatment, such as through a modeled benefit and/or receiving data defining the expected benefit. The agricultural intelligence computer system may determine that the expected benefit, if shown in a single portion of the agronomic field, would not be a benefit greater than 1.6 times the standard deviation, but that the expected benefit, if shown in two portions of the agronomic field, would be a benefit greater than 1.6 times the standard deviation. In response the system may select two portions of the agronomic field for the second treatment in order to ensure that the expected benefit is statistically significant.

The methods described herein may be performed with one or more of the models described in Section 3.2. For example, if the field includes three possible trial locations, the system may compute average deviations of each of the three possible trial locations using the statistical model without covariates and average deviations of each of the three possible trial locations using the statistical model with covariates. The system may then select the combination of location and model type with the lowest average deviation.

4.3. Practical Applications of the Location Identification

The systems and methods described herein utilize a spatial statistical model to identify locations where results of an agronomic trial are more likely to be statistically significant, thereby allowing the system to generate prescription maps to implement a trial based on a yield data, such as a yield map, for a prior year, generate scripts to implement the trial, display data identifying top locations for implementing the trial, and/or display maps identifying top locations for implementation the trial.

As an example of a practical application, at step 808, a prescription map is generated in response to selecting the trial portions of the agronomic field, the prescription map comprising a second treatment in the trial portions that is different than the first treatment. For example, if the agricultural intelligence computer system identifies a particular strip which has the lowest statistical deviation values, the system may select the location for performing a trial using a second treatment that is different than the first treatment. The system may generate a prescription map comprising a spatial map of the agronomic field with data indicating that the second treatment is to be applied to the particular portion of the field and the first treatment is to one or more other portions of the field, such as the remainder of the agronomic field.

The system may select the first treatment for an area of the map originally used to generate the deviation values for the selected portion of the agronomic field. For example, if the system created each statistical model using only strips of finite width on either side of the particular portions of the agronomic field, the system may generate the prescription map such that at least the selected portion of the agronomic field has the second treatment and strips of the finite width on either side of the selected portion receive the first treatment.

By automatically generating a prescription map in response to a selection of one or more of the particular portions of the agronomic field, the system is able to utilize the spatial model as part of the practical process of generating a prescription map for implementing a trial. The system is additionally able to decrease an amount of the agronomic field that is used for trials, thereby decreasing the negative effects of the trials on the agronomic field while increasing the efficacy of the trials.

As an additional example of a practical embodiment, at step 812, one or more scripts are generated. The scripts comprise computer readable instructions which, when executed by an application controller, causes the application controller to control an operating parameter of an agricultural implement on the agronomic field to apply the second treatment to the trial portion of the agronomic field. The scripts may be configured to match the generated prescription map such that the scripts, when executed, cause one or more agricultural implements to execute the prescriptions in the prescription map. The agricultural intelligence computer system may send the scripts to a field manager computing device and/or the application controller over a network.

As an example, if the second treatment comprises a different seeding population than the first treatment, the system may generate instructions which, when executed, cause a planter to release seeds onto the field at the population rate of the second treatment in the selected locations on the agronomic field that match the generated prescription map. Other examples of scripts include nutrient application scripts, pesticide scripts, and/or other planting scripts which vary seed type or seed hybrid. Thus, the methods described herein may be used to operate agriculture machinery based on a determination of trial performance generated from a spatial statistical model.

5. BENEFITS OF CERTAIN EMBODIMENTS

When considered in light of the specification herein, and its character as a whole, this disclosure is directed to improvements in control of operations of field implements and equipment in agriculture, based on improvements in computer-implemented calculation of yield values for agricultural fields, treatments and prescription maps that specify what fertilizer or other nutrient to apply where in fields. The disclosure is not intended to cover or claim the abstract concept of determining yields, treatments or prescriptions but rather to the practical application of the use of computers to control agricultural machinery that is set forth in the preceding sentence.

The systems and methods described herein provide a practical application of the utilization of field data to maximize efficient management of an agronomic field using agricultural machinery. By modeling a control for a trial in the same region as the trial, the system can maximize efficient and effective use of agricultural land by minimizing required area to use to determine if a trial has had a statistically significant positive or negative effect. Thus, the agricultural field can benefit from the modeling techniques provided by setting aside smaller areas for executing a trial.

Additionally, the systems and methods described herein utilize field information as part of a process of physically implementing a trial on an agricultural field using agricultural implements and/or utilizing results of the trial that otherwise would not have been available as part of the physical process of implementing management practices on an agronomic field using agricultural implements. The agricultural intelligence computer system can use the methods described herein to generate a prescription map defining management instructions for testing locations and/or defining management instructions for an agronomic field based on trial results. Additionally or alternatively, the agricultural intelligence computer system can use the methods described herein to generate one or more scripts which, when executed, cause an agricultural implement to perform specific actions on the agricultural field with different actions being performed at the testing locations and/or to change the actions performed on the field in response to trial results.

6. EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
one or more processors;
a memory storing instructions which, when executed by the one or more processors, causes performing:
receiving first yield data for a first portion of an agronomic field, the first portion of the agronomic field having received a first treatment;
receiving second yield data for a second portion of the agronomic field, the second portion of the agronomic field having received a second treatment that is different than the first treatment;
using a spatial statistical model and the first yield data, computing a yield value for the second portion of the agronomic field, the yield value indicating an agronomic yield for the second portion of the agronomic field if the second portion of the agronomic field had received the first treatment instead of the second treatment;
based on the computed yield value and the second yield data, selecting the second treatment;
generating a prescription map based on the spatial statistical model, the prescription map including the second treatment;
generating one or more scripts which, when executed by an application controller, cause the application controller to control an operating parameter of an agricultural implement to apply the second treatment.

2. The system of claim 1, wherein the first treatment and the second treatment comprise one or more of a particular seeding population, hybrid type, pesticide application, or nutrient application.

3. The system of claim 1, wherein the spatial statistical model is configured to compute yield values as a function of a spatially correlated Gaussian process.

4. The system of claim 1, wherein the spatial statistical model is configured to model yield as a function of one or more of percentage of organic matter, pH, cation-exchange capacity, elevation, soil type, or nutrient levels.

5. The system of claim 1, wherein selecting the second treatment comprises:
computing an upper threshold based on the computed yield value;
determining that a yield of the second yield data is greater than the computed yield value and, in response, selecting the second treatment.

6. A system comprising:
one or more processors;
a memory storing instructions which, when executed by the one or more processors, causes performing:
receiving yield data for an agronomic field, the agronomic field having received a first treatment;
for each of a plurality of particular portions of the agronomic field, performing:
using a spatial statistical model and yield data for a separate portion of the agronomic field, computing a yield value for the particular portion of the agronomic field;
using the yield value and a portion of the yield data corresponding to the particular portion of the agronomic field, computing an average statistical deviation value for the particular portion of the agronomic field;
based on the average statistical deviation values for each of the plurality of particular portions of the agronomic field, selecting one or more of the plurality of particular portions of the agronomic field as trial portions of the agronomic field;
generating a prescription map based on the spatial statistical model, wherein the prescription map comprises a second treatment that is different from the first treatment in the trial portions;
generating one or more scripts which, when executed by an application controller, cause the application controller to control an operating parameter of an agricultural implement to apply the second treatment to the trial portions of the agronomic field.

7. The system of claim 6, wherein the first treatment and the second treatment comprise one or more of a particular seeding population, hybrid type, pesticide application, or nutrient application.

8. The system of claim 6, wherein the spatial statistical model is configured to compute yield values as a function of a spatially correlated Gaussian process.

9. The system of claim 6, wherein the spatial statistical model is configured to model yield as a function of one or more of percentage of organic matter, pH, cation-exchange capacity, elevation, soil type, or nutrient levels.

10. The system of claim 6, wherein selecting one or more of the plurality of particular portions of the agronomic field as trial portions of the agronomic field comprises selecting one or more portions with a lowest average statistical deviation of the plurality of particular portions of the agronomic field.

11. A computer-implemented method comprising:
receiving first yield data for a first portion of an agronomic field, the first portion of the agronomic field having received a first treatment;
receiving second yield data for a second portion of the agronomic field, the second portion of the agronomic field having received a second treatment that is different than the first treatment;
using a spatial statistical model and the first yield data, computing a yield value for the second portion of the agronomic field, the yield value indicating an agronomic yield for the second portion of the agronomic field if the second portion of the agronomic field had received the first treatment instead of the second treatment;
based on the computed yield value and the second yield data, selecting the second treatment;
generating a prescription map based on the spatial statistical model, the prescription map including the second treatment;
generating one or more scripts which, when executed by an application controller, cause the application controller to control an operating parameter of an agricultural implement to apply the second treatment.

12. The computer-implemented method of claim 11, wherein the first treatment and the second treatment comprise one or more of a particular seeding population, hybrid type, pesticide application, or nutrient application.

13. The computer-implemented method of claim 11, wherein the spatial statistical model is configured to compute yield values as a function of a spatially correlated Gaussian process.

14. The computer-implemented method of claim 11, wherein the spatial statistical model is configured to model yield as a function of one or more of percentage of organic matter, pH, cation-exchange capacity, elevation, soil type, or nutrient levels.

15. The computer-implemented method of claim 11, wherein selecting the second treatment comprises:
computing an upper threshold based on the computed yield value;
determining that a yield of the second yield data is greater than the computed yield value and, in response, selecting the second treatment.

16. A computer-implemented method comprising:
receiving yield data for an agronomic field, the agronomic field having received a first treatment;
for each of a plurality of particular portions of the agronomic field, performing:
using a spatial statistical model and yield data for a separate portion of the agronomic field, computing a yield value for the particular portion of the agronomic field;
using the yield value and a portion of the yield data corresponding to the particular portion of the agronomic field, computing an average statistical deviation value for the particular portion of the agronomic field;
based on the average statistical deviation values for each of the plurality of particular portions of the agronomic field, selecting one or more of the plurality of particular portions of the agronomic field as trial portions of the agronomic field;
generating a prescription map based on the spatial statistical model, wherein the prescription map comprises a second treatment that is different from the first treatment in the trial portions;
generating one or more scripts which, when executed by an application controller, cause the application controller to control an operating parameter of an agricultural implement to apply the second treatment to the trial portions of the agronomic field.

17. The computer-implemented method of claim 16, wherein the first treatment and the second treatment comprise one or more of a particular seeding population, hybrid type, pesticide application, or nutrient application.

18. The computer-implemented method of claim 16, wherein the spatial statistical model is configured to compute yield values as a function of a spatially correlated Gaussian process.

19. The computer-implemented method of claim 16, wherein the spatial statistical model is configured to model yield as a function of one or more of percentage of organic matter, pH, cation-exchange capacity, elevation, soil type, or nutrient levels.

20. The computer-implemented method of claim 16, wherein selecting one or more of the plurality of particular portions of the agronomic field as trial portions of the agronomic field comprises selecting one or more portions with a lowest average statistical deviation of the plurality of particular portions of the agronomic field.

* * * * *